(12) United States Patent
Weber et al.

(10) Patent No.: US 9,377,860 B1
(45) Date of Patent: Jun. 28, 2016

(54) ENABLING GESTURE INPUT FOR CONTROLLING A PRESENTATION OF CONTENT

(71) Applicant: Amazon Technologies, Inc., Reno, NV (US)

(72) Inventors: Jason Robert Weber, Mountain View, CA (US); Matthew Paul Bell, Sunol, CA (US); Isaac Scott Noble, Soquel, CA (US); Guenael Thomas Strutt, San Jose, CA (US); Stephen Michael Polansky, Santa Clara, CA (US); Dong Zhou, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 164 days.

(21) Appl. No.: 13/720,172

(22) Filed: Dec. 19, 2012

(51) Int. Cl.
*G06F 3/045* (2006.01)
*G06F 3/01* (2006.01)

(52) U.S. Cl.
CPC ..................... *G06F 3/017* (2013.01)

(58) Field of Classification Search
CPC .......... G06K 9/00201; G06K 9/00375; G06K 9/00523; G06K 9/3233; G06K 9/00355; G06T 7/004; G06T 7/0073; G06T 7/2093; G06T 2207/10016; G06T 2207/30196; B60K 35/00; B60K 37/06; B60K 2350/1052; B60K 2350/2013; B60K 2350/2052; G06F 1/1632; G06F 1/1686; G06F 3/017; G06F 3/048; G06F 3/0487

USPC ................ 348/148–155; 705/14.63; 715/863; 345/156, 165, 166, 173–179; 178/18.01–18.04
See application file for complete search history.

(56) References Cited

U.S. PATENT DOCUMENTS

| | | | |
|---|---|---|---|
| 8,599,173 B2* | 12/2013 | Soo et al. ....................... 345/175 |
| 2009/0172606 A1* | 7/2009 | Dunn et al. .................... 715/863 |
| 2011/0041100 A1* | 2/2011 | Boillot .......................... 715/863 |
| 2012/0095643 A1* | 4/2012 | Bose et al. ................... 701/32.8 |
| 2013/0002577 A1* | 1/2013 | Kim .............................. 345/173 |
| 2013/0155237 A1* | 6/2013 | Paek et al. ..................... 348/148 |
| 2013/0182902 A1* | 7/2013 | Holz .............................. 382/103 |
| 2013/0344859 A1* | 12/2013 | Abramson et al. ............. 455/418 |
| 2014/0081517 A1* | 3/2014 | Barrett .................. B60K 35/00 701/36 |
| 2014/0142783 A1* | 5/2014 | Grimm et al. ..................... 701/2 |

* cited by examiner

*Primary Examiner* — Kent Chang
*Assistant Examiner* — Nelson Rosario
(74) *Attorney, Agent, or Firm* — Polsinelli LLP

(57) ABSTRACT

Approaches are described for providing input to a portable computing device, such as a mobile phone. A user's hand can be detected based on data (e.g., one or more images) obtained by at least one sensor of the device, such as camera, and the images can be analyzed to locate the hand of the user. As part of the location computation, the device can determine a motion being performed by the hand of the user, and the device can determine a gesture corresponding to the motion. In the situation where the device is controlling a media player capable of playing media content, the gesture can be interpreted by the device to cause the device to, e.g., pause a media track or perform another function with respect to the media content being presented via the device.

25 Claims, 10 Drawing Sheets

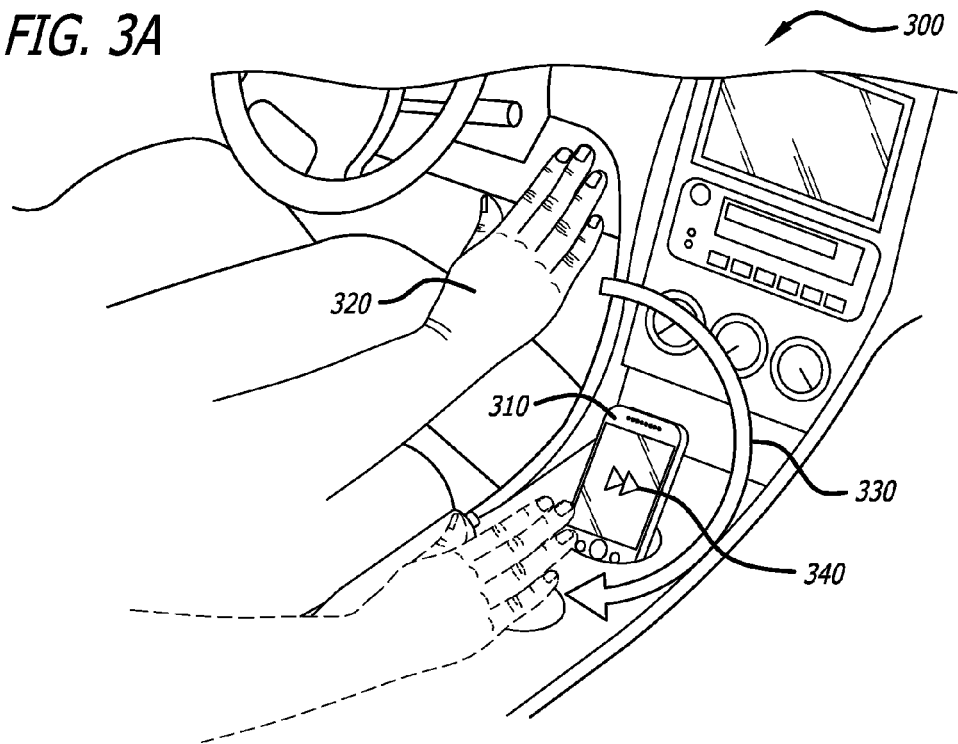
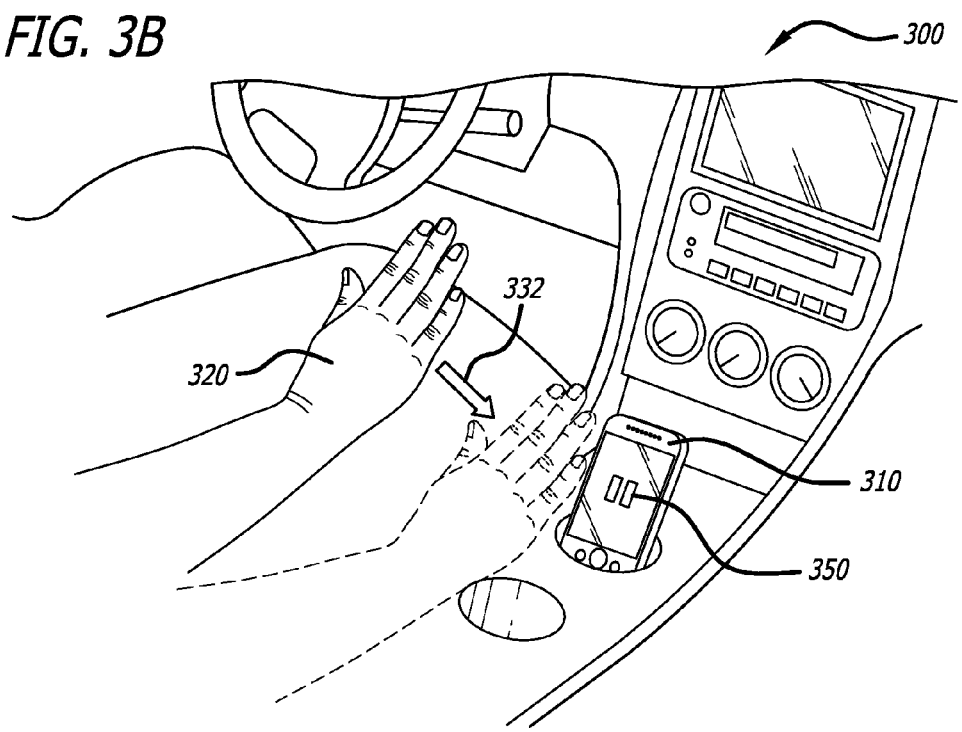

ENABLING GESTURE INPUT FOR CONTROLLING A PRESENTATION OF CONTENT

BACKGROUND

As computing devices offer increasing processing capacity and functionality, users are able to operate these devices in an expanding variety of ways. For example, users can utilize a touch sensitive display of the device to interact or otherwise operate the device. Conventionally, these displays can be used to display a wide variety of information, including maps, images, graphical user interface elements, and the like; and a user can touch an interface element (such as an icon) being displayed on the display in order to activate a particular function or operate an application on the device. For example, a user can touch or interact with the display of the device to control a media player (e.g., to skip a media track), a navigation program (e.g., to forward through a list of directions), or some other application. In some instances, however, the user may desire to operate the device where touch input is not possible or permitted, or where diverting their visual focus to the device is dangerous (such as when driving).

BRIEF DESCRIPTION OF THE DRAWINGS

Various embodiments in accordance with the present disclosure will be described with reference to the drawings, in which:

FIGS. 3A-3D illustrate example implementations for determining user input to a mobile device to perform a function with respect to media being presented via the mobile device, in accordance with an embodiment;

DETAILED DESCRIPTION

Figure 1:
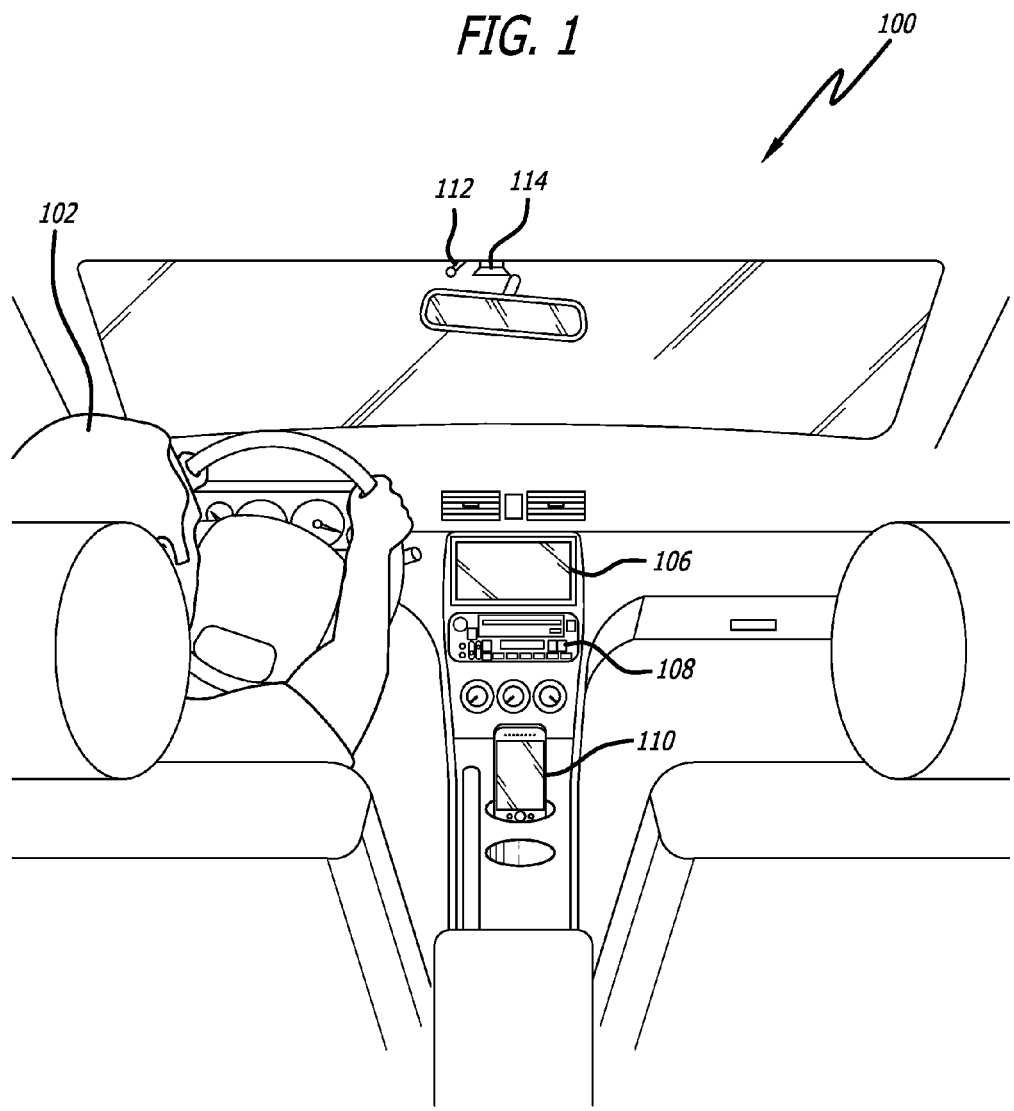
FIG. 1 illustrates an example situation for determining user input to a mobile device, in accordance with an embodiment.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for providing input to an electronic device. In particular, various embodiments enable a user to utilize a hand, or various other features or objects, to interact with an interface of a computing device (e.g., a mobile phone, tablet computer, etc.) or other portable electronic device to cause a function or other action to be performed by the device. In at least some embodiments, a signal or other indication communicated through wired or short-range wireless technologies, such as Bluetooth, ultra-wide band (UWB), wireless Universal Serial Bus (USB), Near Field Communication (NFC) is received at the device, where the device can communicate with an automobile to determine that the device is within a detection range of the automobile. In response to determining the signal, the device can activate a media control mode or other such mode in which the device is operable to detect a user's hand, or other object, within a gesture area (e.g., a foot away from the device). The detected hand can cause the device to perform a function, such as skipping a media track being played by the device.

For example, a user's hand can be detected based at least in part on data (e.g., one or more images) obtained by one or more sensors of the device, such as camera (e.g., a front-facing camera), capacitive sensors, ultrasonic sensors, or combinations thereof. The one or more images can be analyzed to locate the hand of the user with respect to the device, the hand being located within a gesture area (e.g., a foot within the device) relative to the device. In various embodiments, the gesture area is an area in which the device can detect a motion or other movement being performed by the user. For example, using at least one of the sensors described above, the gesture area can include an entire area detected by the sensors, where the detectable area is limited by what the sensors cannot capture. In other instances, the gesture area can include a portion of the area detected by the sensors, such as any area within a foot or other distance relative to the device, the area including e.g., at least the front, rear, sides and bottom of the device). As part of the location computation, or in addition to the location computation, the device can compute (or estimate) a motion being performed by the hand of the user within the gesture area. The device can determine a gesture corresponding to the motion, where the gesture can be one of a plurality of gestures. In the situation where the device is controlling a media player capable of playing media content (e.g., music), such as on the device or elsewhere, the gesture can be interpreted by the device to cause the device to, e.g., pause a media track or perform another function with respect to the media content being presented via the device.

As used herein, "track", "media track", "media" or "content" refers to a single song, video, or piece of sequential content with a finite duration; "point of play" refers to a single time stamp (i.e., point in time) within the currently active track (which is either currently playing or paused); "media player" refers to as a software application used by users to listen to media; "device", "computing device" or "portable computing device" refers to the hardware that is running the media player; and "gesture area" refers to an area within range of gesture detection sensors on the device (e.g., one or more cameras).

In various embodiments, the motion can correspond to one of a plurality of gestures, where each gesture can be associated with a function or action used to control some aspect of an application (e.g., a media player) operating on the device, or other automobile component (e.g., a navigation system). For example, in accordance with an embodiment, while a track is playing, when the user's hand moves in the gesture area in a clockwise circular motion, the device can cause the point of play to advance forward in the time sequence of the current track. The speed in which the point of play advances is based at least in part on the speed in which the hand is rotating, and can be tuned to accelerate based on the amount of full circles. While fast-forwarding, the user can hear bits of the track to give the user an indication of where the point of play is located in the track. In other embodiments, the user can perform a gesture to rewind a track currently playing. For example, while the track is playing, when the user's hand moves in the gesture area in a counter-clockwise circular motion, the device can cause the point of play to reverse backward in the time sequence of the current track. The speed in which the point of play reverses is based at least in part on the speed in which the hand is rotating, and can be tuned to accelerate based at least in part on the amount of full circles. While rewinding, the user can hear bits of the track which can give the user an indication of where the point of play is located in the track.

In another embodiment, the user can perform a gesture to pause a track. For example, while the track is playing, when the user's hand moves towards the gesture area with the palm open and facing downward, the device can cause the point of play to pause within the track at the moment directly after the gesture is executed, leaving the track in a paused state. Additionally, while the track is in a paused state, when the user's hand moves towards the gesture area with the palm open and facing downward, the device can cause the point of play to resume within the track where it was left off from the beginning of the paused state, and the device can cause the track to continue playing at the moment directly after the gesture is executed.

In another embodiment, the user can perform a gesture to skip to a next track. For example, while the track is playing or in a paused state, when the user's hand moves in a left-to-right motion, the device can cause the point of play to move to the beginning of the next track within the media. Additionally, while the track is playing or in a paused state, when the user's hand moves in a right-to-left motion, the device can cause the point of play to move to the beginning of the current track. Further, within a determined period of time (e.g., a few seconds) of performing a repeat track gesture, when the user's hand moves in a right-to-left motion in the gesture area, the device can cause the point of play to move to the beginning of the previous track.

In other embodiments, the user can perform a gesture to turn up the volume of the device playing the track. For example, in this embodiment, while the track is playing or in a paused state, when the user's hand moves in a down-to-up motion with the palm open and facing upward, or when the user places their fingers out as if clenching a volume knob and turns their hand in a clockwise twisting motion in the gesture area, the device can cause the volume of the device to increase. In accordance with an embodiment, the user can perform a gesture to turn down the volume of the device. In this instance, while the track is playing or in a paused state, when the user's hand moves in an up-to-down motion with the palm open and facing upward, or when the user places their fingers out as if clenching a volume knob and turns the hand in a counter-clockwise twisting motion in the gesture area, the device can cause the volume of the device to decrease.

It should be noted that other gestures can be used in accordance with embodiments described herein to control a media player (or other application) operating on the computing device. It should be further noted that, in accordance with various embodiments, the other gestures (or the gestures presently described) can be used to control a component of the automobile. Accordingly, the embodiments disclosed herein are examples of gestures that might be used, and other gestures for the above actions (or new actions) are possible. For example, the device can cause a track to pause when the user holds up two fingers above the device or can cause the device to speak back media information for the track currently playing when the user repeatedly opens and closes their fingers (such as to indicate a talking gesture). Other examples can include a shaking motion of a user's hand in the gesture area, where the shaking motion can cause the device to enter a voice input mode. In this mode, the device can receive one or more voice commands that can cause the device to perform a function, such as starting a navigation program or use a text-to-speech component to speak back a current media track being played. Additional gestures can be detected, where these gestures can cause a media track to be added to a playlist, can cause a song to be liked or disliked, among others.

Various other functions and advantages are described and suggested below as may be provided in accordance with the various embodiments.

As mentioned above, in some instances, a user may desire to operate a computing device where touch input is not possible (or permitted), or where diverting one's visual focus to the device is dangerous (such as when driving). In addition to this, users frequently listen to media while driving and, in some instances, much of a user's media can be found on their mobile device. As such, it would be desirable for users to access this media while driving or operating other objects that limit or restrict a user's ability to access this media. However, not only is it illegal in some areas to physically operate a mobile device while driving, it can be dangerous to divert one's attention from the road in order to control a media player or other application on a mobile device. Accordingly, it can be desirable to operate or otherwise control media (or another application) on a mobile device, such as to fast-forward, rewind, pause, resume, skip tracks, repeat tracks, or change the volume, while simultaneously driving or performing some other activity.

However, conventional methods of executing this functionality require a user to physically touch specific locations of a touch sensitive screen (or in some instances, a physical button) while simultaneously visually focusing on the device to ensure the media is accurately controlled. This approach, and others like it, can cause the user to divert their attention from driving to the mobile device, which can create a dangerous situation for the user and other people. In accordance with various embodiments, systems and methods enable a user to utilize a hand, or various other features or objects, to interact with an interface on the device to cause a function or other action to be performed by the device without the user having to make physical contact with the device.

FIG. 1 illustrates an example situation for determining user input to a mobile device, in accordance with an embodiment. As shown in FIG. 1, a user 102 (e.g., a driver of an automobile) is positioned within an automobile 100. The automobile, in this example, includes at least a navigation system 106 and a car radio system 108. A computing device 110, such as a mobile phone, is positioned in a cup holder of the automobile. In various other embodiments, the device can be secured in a dedicated mount (such as a mobile phone mount) or other holder. Although a mobile phone is shown, it should be understood that any electronic device capable of receiving, determining, and/or processing input can be used in accordance with various embodiments discussed herein, where the devices can include, for example, notebook computers, personal data assistants, tablets, an electronic data receiving device or sensor built into the automobile, among others. For example, as shown in FIG. 1, the automobile can include one or more electronic data receiving devices (or sensors) that can be used to control or otherwise operate a component (such as a navigation system or car audio system) of the automobile, where the sensors can include a built in microphone 112 capable of receiving audio input, and/or a camera 114 capable of obtaining image (or video) data, among others.

The mobile device, in this example, includes a camera (e.g., a front and rear-facing camera) and an interface (e.g., a display element) that displays an application or service (e.g., a media player). If the user wants to interact with the interface to, e.g., control a media player displayed on the interface using a conventional approach, the user would typically touch the screen of the device and swipe the user's thumb or other finger in a specific direction in order to operate the media player. However, in this situation, the user is driving, and is unable to physically interact with the device.

In accordance with various embodiments, the device can enter a control mode, such as a media control mode (or other control mode such as an automobile control mode) when the device is positioned within the automobile. In this case, the user is able to utilize a hand, or various other features or objects to interact (such as by using air gestures) with the interface of the device to cause a function or other action to be performed by the device, such as to control a function of a media player or a component of the automobile.

The device can enter the media control mode when, for example, a signal or other indication communicated through wired or short-range wireless technologies, such as Bluetooth, ultra-wide band (UWB), wireless Universal Serial Bus (USB), Near Field Communication (NFC) is received at the device, where the device can communicate with the automobile to determine that the device is positioned or located within a detection range of the automobile. In other embodiments, determining that the device is positioned within the detection range of the automobile can cause the device to determine, using the at least one sensor of the device, an orientation of the user relative to the device, and based at least in part on the orientation of the user, the device can calibrate each of the plurality of gestures to correspond with the orientation of the user. For example, the gestures can be calibrated for the situation where different sensors (i.e., a front or a rear-facing camera) of the device are being used to detect the user gesture, such as when the device is rotated into a different orientation (i.e., on its side or upside down), or in any situation where the user is positioned in a location other than in front of the device.

In accordance with various other embodiments, in response to determining that the device is positioned or located within a detection range of the automobile, the device can be paired with the automobile to control a component of the automobile, such as a navigation unit or car auto system, based at least in part on detected gestures. For example, upon associating (or pairing) the device to the automobile, a gesture performed by the user can be determined, and in response to determining the gesture, the device can perform a function with respect to media content being presented via the car audio system of the automobile (such as pausing the media content), or information associated with the navigation system (such as pausing navigation).

In some embodiments, the sensors of the automobile can be used to control the components of the automobile without the use of the mobile device. For example, as described above, the automobile is capable of receiving audio input from a microphone 112 and can capture image data (an image or video) using the camera 114. As such, the camera of the automobile can be used to obtain one or more images, and a system processor or other component of the automobile can analyze the one or more images to locate the hand of the user (e.g., the driver) with respect to the automobile camera, the hand being located within a gesture area relative to the camera of the automobile. Thereafter, the system processor of the automobile can detect a motion performed by the hand of the driver within the gesture area, determine a gesture corresponding to the motion, and cause a function to be performed with respect to one of the components of the automobile.

Figure 2A:
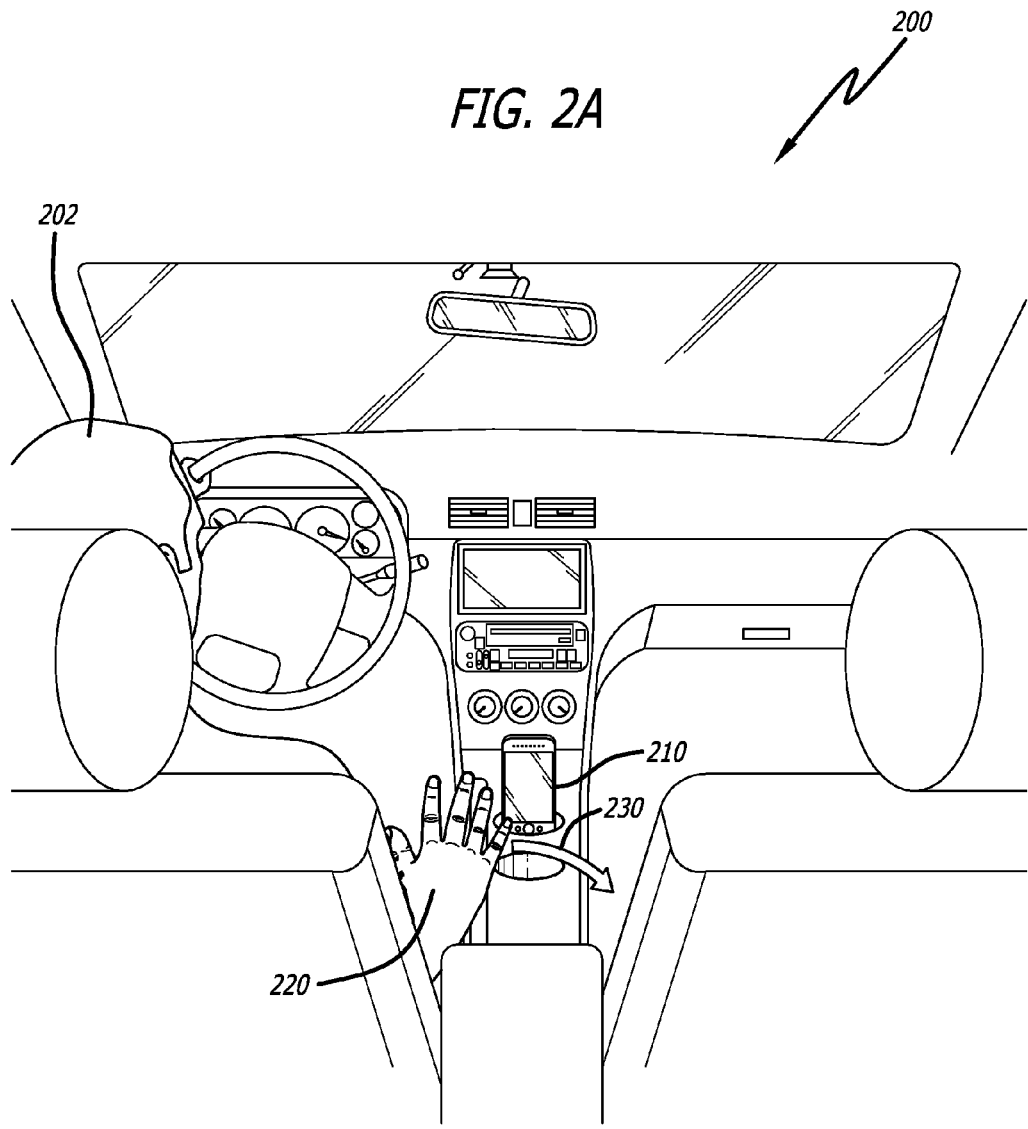
FIGS. 2A-2B illustrate an example implementation for determining user input to a mobile device to skip a media track being presented via the mobile device, in accordance with an embodiment.
Figure 2B:
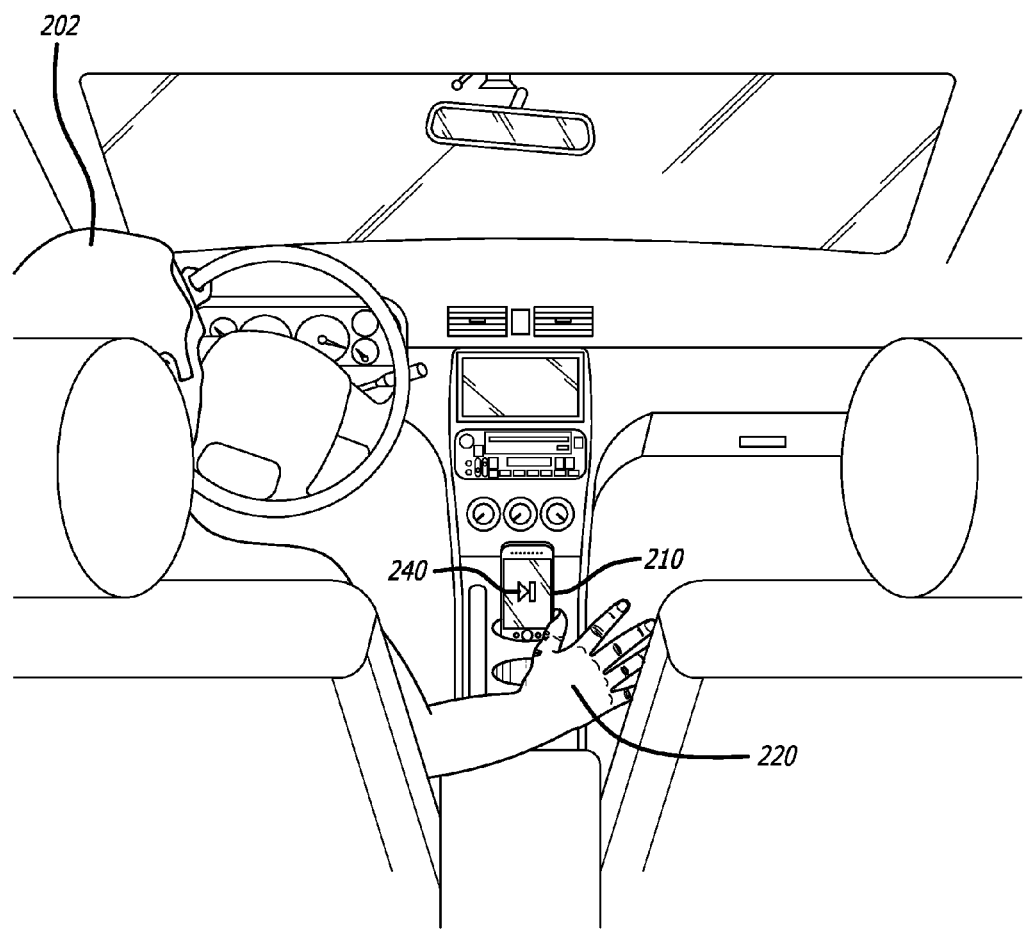

As described above, the user is able to utilize gestures to cause a function or other action to be performed by the device, such as to a media player. FIGS. 2A-2B illustrate an example implementation for determining user input to a mobile device to skip a media track being presented via the mobile device, in accordance with an embodiment. As shown in FIG. 2A, a user 202 is driving an automobile 200 and a computing device, such as a mobile device 210, is positioned in a cup holder of the automobile. In the illustrated embodiment, the mobile device can detect at least a portion of the user's hand 220 within a specified range (e.g., a gesture area) of the mobile device. The gesture area can be a particular range of distances (e.g., 0-12 inches away from the mobile device), or the gesture area can be a maximum detectable range of the sensors (e.g., front-facing camera, capacitive sensors, ultrasonic sensor, etc.) of the mobile device. In accordance with an embodiment, the mobile device can detect the user's hand based at least in part on data obtained by one or more sensors (e.g., a front-facing camera) of the mobile device using a number of approaches. One example of an approach for detecting the user's hand is described with reference to FIGS. 4A-4D.

In the illustrated embodiment, a motion (e.g., a left-to-right motion) 230 of the user's hand 220 can cause the mobile device to skip a media track. For example, the user moves their hand in a left-to-right motion 230 relative to the mobile device, such as in a gesture area of the mobile device, where the device obtains one or more images and analyzes the images to locate the hand of the user with respect to the mobile device. As part of the location computation, or in addition to the location computation, the mobile device computes (or estimates) the motion performed by the hand of the user within the gesture area, and determines a gesture corresponding to the motion. In this situation, the mobile device is controlling a media player capable of playing media content (e.g., music), and as shown in FIG. 2B, the left-to-right motion can be interpreted by the mobile device to cause the mobile device to skip to the next track (as indicated by the graphical indication 240 on the mobile device).

It should be noted that at least one gesture can be used to control other applications or services of the mobile device, such as a phone application. For example, when receiving an incoming call while the automobile control mode is activated, a left-to-right motion of the hand of the user relative to the mobile device during the incoming call can cause the mobile device to answer the incoming call. In a similar embodiment, when receiving the incoming call while the automobile control mode is activated, the hand of the user being held over the mobile device during the incoming call can cause the mobile device to reject the incoming call.

Figure 3C:
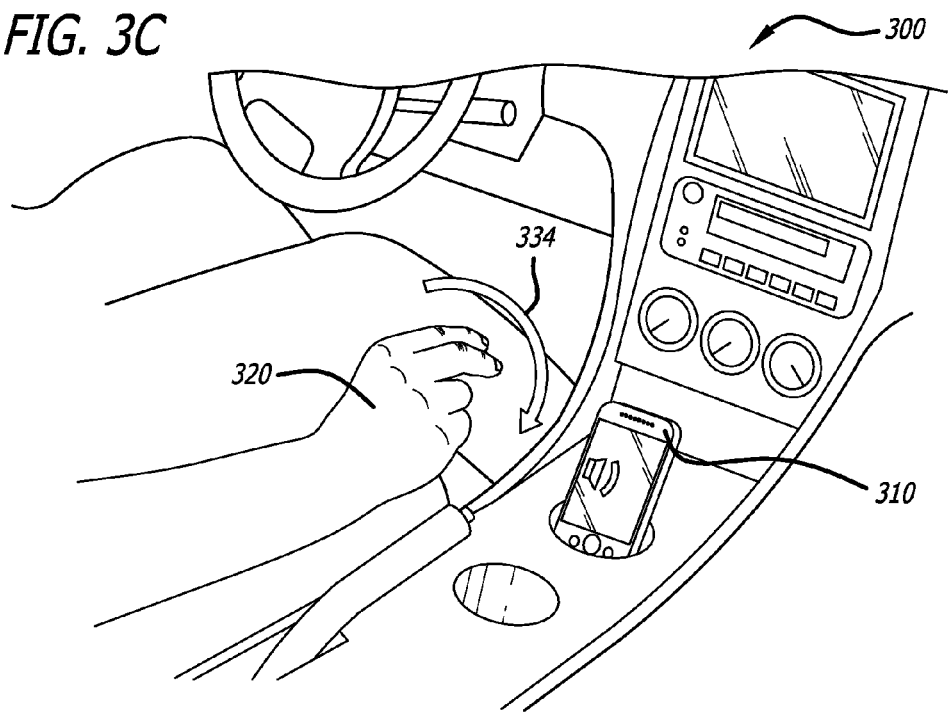

FIGS. 3A-3D illustrate example implementations for determining user input to a computing device (such as a mobile device) to perform a function with respect to media content being presented via the device, in accordance with an embodiment. As shown in FIG. 3A, a user is driving an automobile and a computing device 310 is positioned in a cup holder of the automobile. In the illustrated embodiment, the driver is performing a gesture to control a function of the media player operating on the computing device. As shown in FIG. 3A, the driver's hand is moving in a clockwise motion in the gesture area relative to the computing device to cause a media track currently playing on the device to fast-forward.

In accordance with an embodiment, the computing device 310 determines the clockwise motion of the driver's hand based at least in part on data received from one or more sensors of the computing device. For example, the computing device may continuously monitor the gesture area, and detect when the driver's hand comes within the gesture area. When the device detects the user's hand, the device can capture images of the driver's hand as the driver performs the motion. The device can then analyze the images to detect the clockwise motion, and in response detecting the motion, the device can cause the media track to fast-forward. In accordance with an embodiment, the speed at which the media track advances can be based on the speed in which the hand is rotating, and can be tuned to accelerate based on the amount of full circles. For example, two or more full circles can cause the media track to advance at a rate twice as fast as the default rate of advancement. In accordance with an embodiment, while fast-forwarding the media, the driver can hear bits the media, which can provide the driver with feedback and intuitive control of the media player.

FIG. 3B illustrates an example of using a gesture to pause a media track playing on the device, in accordance with an embodiment. As shown in FIG. 3B, the user is driving an automobile and the device 310 is positioned in a cup holder of the automobile, as previously described. In the illustrated embodiment, the driver's hand 320 is moving in a forward motion 332 in the gesture area relative to the device to cause a media track currently playing to pause. As previously described, while the track is playing, moving a hand towards the device within the gesture area with the palm open and facing downward will pause the track at the moment directly after the gesture is executed.

In accordance with an embodiment, the computing device 310 can determine (e.g., estimate) a distance between the driver's hand and the device. In some embodiments, the distance can be determined as part of determining the location of the hand, such as by determining the three dimensional (X, Y, Z) coordinates of the hand, where the X, Y plane is the primary plane of a display screen of the device and Z is the distance from the hand to the display screen. In other embodiments, the distance can be determined as a separate computing from the location determination. Upon determining an initial distance of the driver's hand relative to the device, the device can determine a forward motion of the driver's hand based at least in part on data received from one or more sensors of the device. For example, the device can capture images of the driver's hand as the driver performs the forward motion, where the device can analyze the images to detect the forward motion. Thereafter, in response to detecting the forward motion, the device can cause the media track to pause.

The media track can be paused until another gesture is detected (or the same gesture). For example, the user can make a subsequent forward motion of their hand towards the device within the gesture area to cause the device to resume play of the media track. In this instance, the track will resume play where it was left off from the beginning of the paused state at the moment directly after the gesture is executed.

Figure 3D:
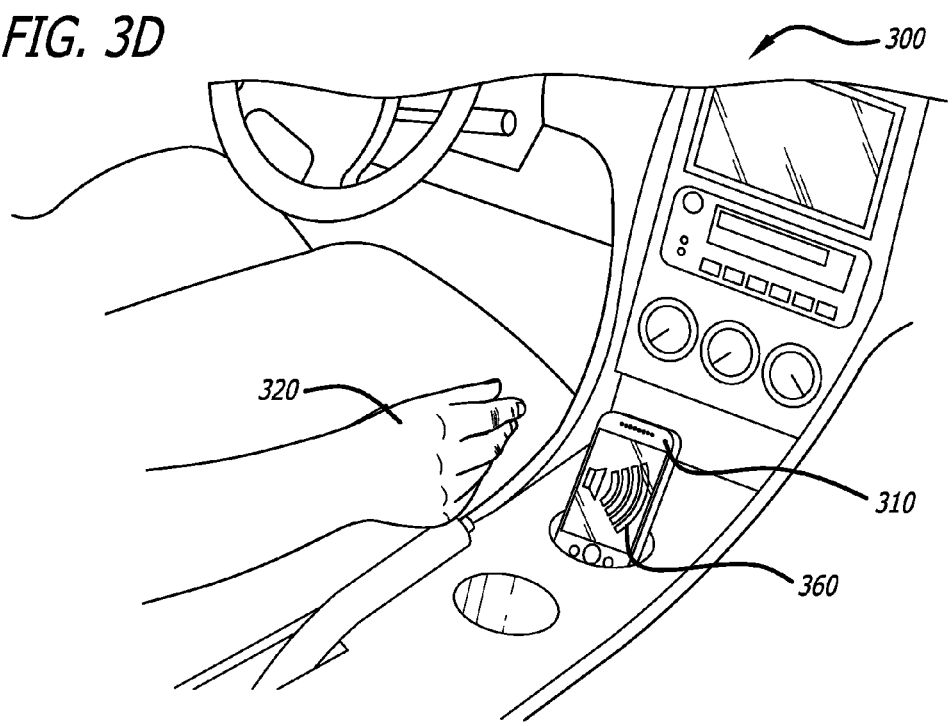

FIGS. 3C-3D illustrate an example of using a gesture to increase a volume level of a portable computing device playing a media track, in accordance with an embodiment. As shown in FIGS. 3C-3D, similar to above, a user is driving an automobile 300, and a computing device 310 is positioned in a cup holder of the automobile. In the illustrated embodiment, the driver's hand 320 is moving in a clockwise twisting motion 334 in the gesture area relative to the computing device, where the fingers are out as if they are clenching a volume knob. In this embodiment, when the computing device detects the twisting gesture, the device volume is adjusted from a current level to an increased level 360.

In accordance with an embodiment, the computing device 310 determines the clockwise motion of the driver's fingers based at least in part on data received from one or more sensors of the device, where the device analyzes the images to detect the clockwise motion of the driver's fingers. In other embodiments, the user can perform a different gesture to turn up the volume level of the device. In this embodiment, while the track is playing or in a paused state, when the user's hand moves in a down-to-up motion with the palm open and facing upward, the device volume can be increased. In accordance with another embodiment, the user can perform another gesture to turn down the volume level of the device. In this instance, while the track is playing or in a paused state, when the user's hand moves in an up-to-down motion with the palm open and facing upward, or when the user places their fingers out as if clenching a volume knob and turns the hand in a counter-clockwise twisting motion in the gesture area, the device volume can be decreased.

In various embodiments, to determine the location of the user's finger (or other object), with respect to a display screen or other such element of a computing device, a number of potential approaches can be used. FIGS. 4A-4D illustrate an example approach to determining a relative distance and/or location of the user's finger, hand or other feature that can be utilized in accordance with various embodiments. In this example, input can be provided to a computing device 402 by monitoring the location of the user's fingertip 404 with respect to the device, although various other features of the user can be used as well, as discussed and suggested elsewhere herein. In some embodiments, a single camera (e.g., front facing camera) can be used to capture image information including the user's fingertip, where the relative location can be determined in two dimensions from the position of the fingertip in the image and the distance 490 determined by the relative size of the fingertip in the image. In other embodiments, a distance detector or other such sensor can be used to provide the distance information. The illustrated computing device 402 in this example instead includes at least two different image capture elements 406, 408 positioned on the device with a sufficient separation such that the device can utilize stereoscopic imaging (or another such approach) to determine a relative location of one or more features with respect to the device in three dimensions. Although two cameras are illustrated near a top and bottom of the device in this example, it should be understood that there can be additional or alternative imaging elements of the same or a different type at various other locations on the device within the scope of the various embodiments. Further, it should be understood that terms such as "top" and "upper" are used for clarity of explanation and are not intended to require specific orientations unless otherwise stated. In this example, the upper camera 406 is able to see the fingertip 404 of the user as long as that feature is within a field of view 410 of the upper camera 406 and there are no obstructions between the upper camera and that feature. If software executing on the computing device (or otherwise in communication with the computing device) is able to determine information such as the angular field of view of the camera, the zoom level at which the information is currently being captured, and any other such relevant information, the software can determine an approximate direction 414 of the fingertip with respect to the upper camera. In some embodiments, methods such as ultrasonic detection, feature size analysis, luminance analysis through active illumination, or other such distance measurement approaches can be used to assist with location determination as well.

Figure 4A:
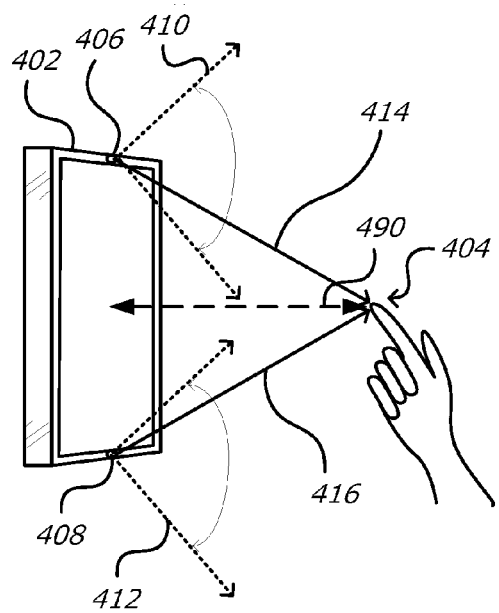
FIGS. 4A-4D illustrate an example approach to determining a relative distance and/or location of at least one feature of a user that can be utilized in accordance with various embodiment.

In this example, a second camera is used to assist with location determination as well as to enable distance 490 determinations through stereoscopic imaging. The lower camera 408 in FIG. 4A is also able to image the fingertip 404 as long as the feature is at least partially within the field of view 412 of the lower camera 408. Using a similar process to that described above, appropriate software can analyze the image information captured by the lower camera to determine an approximate direction 416 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a forty-five degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

In some embodiments, information from a single camera can be used to determine the relative distance 490 to an object, such as a feature of a user (e.g., fingertip). For example, a device can determine the size of a feature (e.g., a finger, hand, pen, or stylus) used to provide input to the device. By monitoring the relative size in the captured image information, the device can estimate the relative distance 490 to the feature. This estimated distance 490 can be used to assist with location determination using a single camera or sensor approach.

Figure 4B:
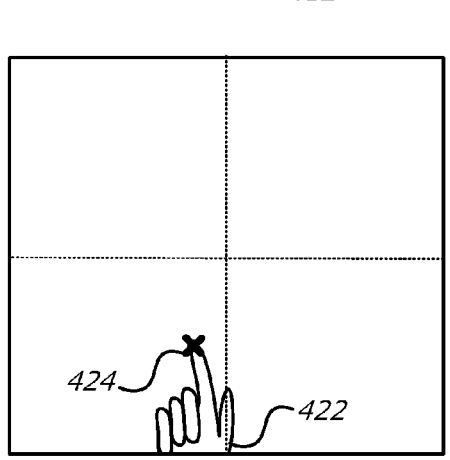
Figure 4C:
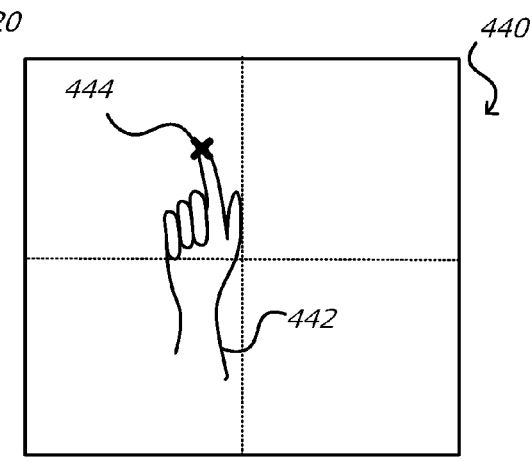

Further illustrating such an example approach, FIGS. 4B and 4C illustrate example images 420, 440 that could be captured of the fingertip using the cameras 406, 408 of FIG. 4A. In this example, FIG. 4B illustrates an example image 420 that could be captured using the upper camera 406 in FIG. 4A. One or more image analysis algorithms can be used to analyze the image to perform pattern recognition, shape recognition, or another such process to identify a feature of interest, such as the user's fingertip, thumb, hand, or other such feature. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 422, at least one point of interest 424, here the tip of the user's index finger, is determined. As discussed above, the software can use the location of this point with information about the camera to determine a relative direction to the fingertip. A similar approach can be used with the image 440 captured by the lower camera 408 as illustrated in FIG. 4C, where the hand 442 is located and a direction to the corresponding point 444 determined. As illustrated in FIGS. 4B and 4C, there can be offsets in the relative positions of the features due at least in part to the separation of the cameras. Further, there can be offsets due to the physical locations in three dimensions of the features of interest. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

As can be seen in FIG. 4A, however, there can be a region near the surface of the screen that falls outside the fields of view of the cameras on the device, which creates a "dead zone" where the location of a fingertip or other feature cannot be determined (at least accurately or quickly) using images captured by the cameras of the device.

Figure 4D:
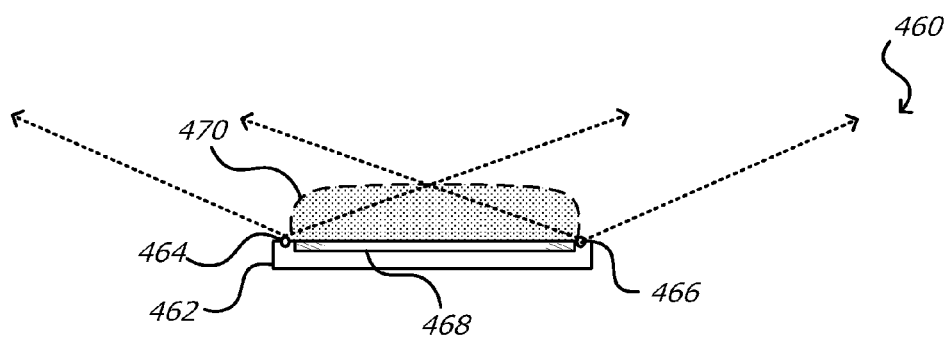

FIG. 4D illustrates an example configuration 460 wherein the device 462 includes a pair of front-facing cameras 464, 466 each capable of capturing images over a respective field of view. If a fingertip or other feature near a display screen 468 of the device falls within at least one of these fields of view, the device can analyze images or video captured by these cameras to determine the location of the fingertip. In order to account for position in the dead zone outside the fields of view near the display, the device can utilize a second detection approach, such as by using a capacitive touch detection component as known or used in the art with various touch screens. A capacitive touch detection component can detect position at or near the surface of the display screen. By adjusting the parameters of the capacitive touch detection component, the device can have a detection range 470 that covers the dead zone and also at least partially overlaps the fields of view. Such an approach enables the location of a fingertip or feature to be detected when that fingertip is within a given distance of the display screen, whether or not the fingertip can be seen by one of the cameras. Other location detection approaches can be used as well, such as ultrasonic detection, distance detection, optical analysis, and the like.

Figure 5:
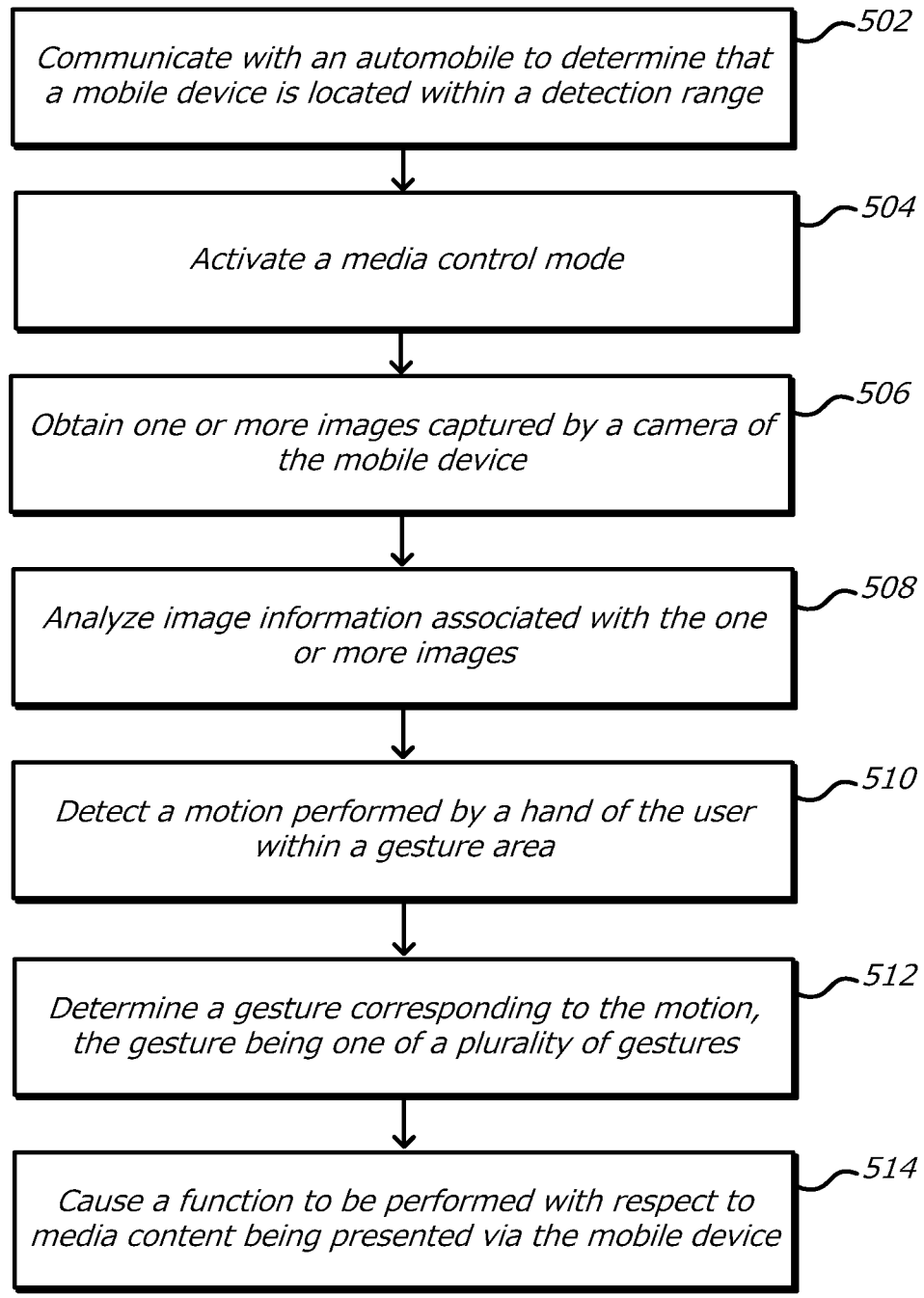
FIG. 5 illustrates an example process for determining user input to a mobile device, in accordance with various embodiments.

FIG. 5 illustrates an example process for determining user input to a mobile device, in accordance with various embodiments. It should be understood that, for any process described herein, that there can be additional or fewer steps performed in similar or alternative orders, or in parallel, within the scope of the various embodiments unless otherwise stated. At step 502, a signal or other indication communicated through wired or short-range wireless technologies, such as Bluetooth, ultra-wide band (UWB), wireless Universal Serial Bus (USB), Near Field Communication (NFC) is received at a computing device, where the device can communicate with an automobile to determine that the device is positioned or located within a detection range of the automobile. At step 504, upon determining that the device is positioned within the detection range, the device activates a media control mode. In this mode, the device can detect a user's hand, or other object, within a gesture area (e.g., a foot away from the device), and detecting the user's hand can cause the device to perform a function, such as skipping a track playing on a media player of the device.

At step 506, one or more images are captured by a camera (e.g., a front-facing camera) of the device, and the user's hand can be detected based at least in part on the images. For example, the location and any movement of the user's hand can be determined using any number of approaches, such as the approach described with reference to FIGS. 4A-4D.

At step 508, the images are analyzed to locate the hand of the user with respect to the device, the hand being located within a gesture area relative to the mobile computing device. At step 510, as part of the location computation, or in addition to the location computation, the device computes (estimates or detects) a motion performed by the hand of the user within the gesture area. At step 512, the device determines a gesture corresponding to the motion, where the gesture can be one of a plurality of gestures (such as the gestures described with reference to FIGS. 1-3).

At step 514, the gesture is interpreted by the device to cause the device to perform a function with respect to the media content being presented via the device. For example, in accordance with an embodiment, upon determining a forward motion of the hand of the user relative to the computing device, the computing device can pause a media track being presented via the computing device. In another embodiment, upon determining a subsequent forward motion of the hand of the user relative to the computing device while the computing device is in a paused state, the computing device can resume play of the media track being presented via the computing device.

Figure 6:
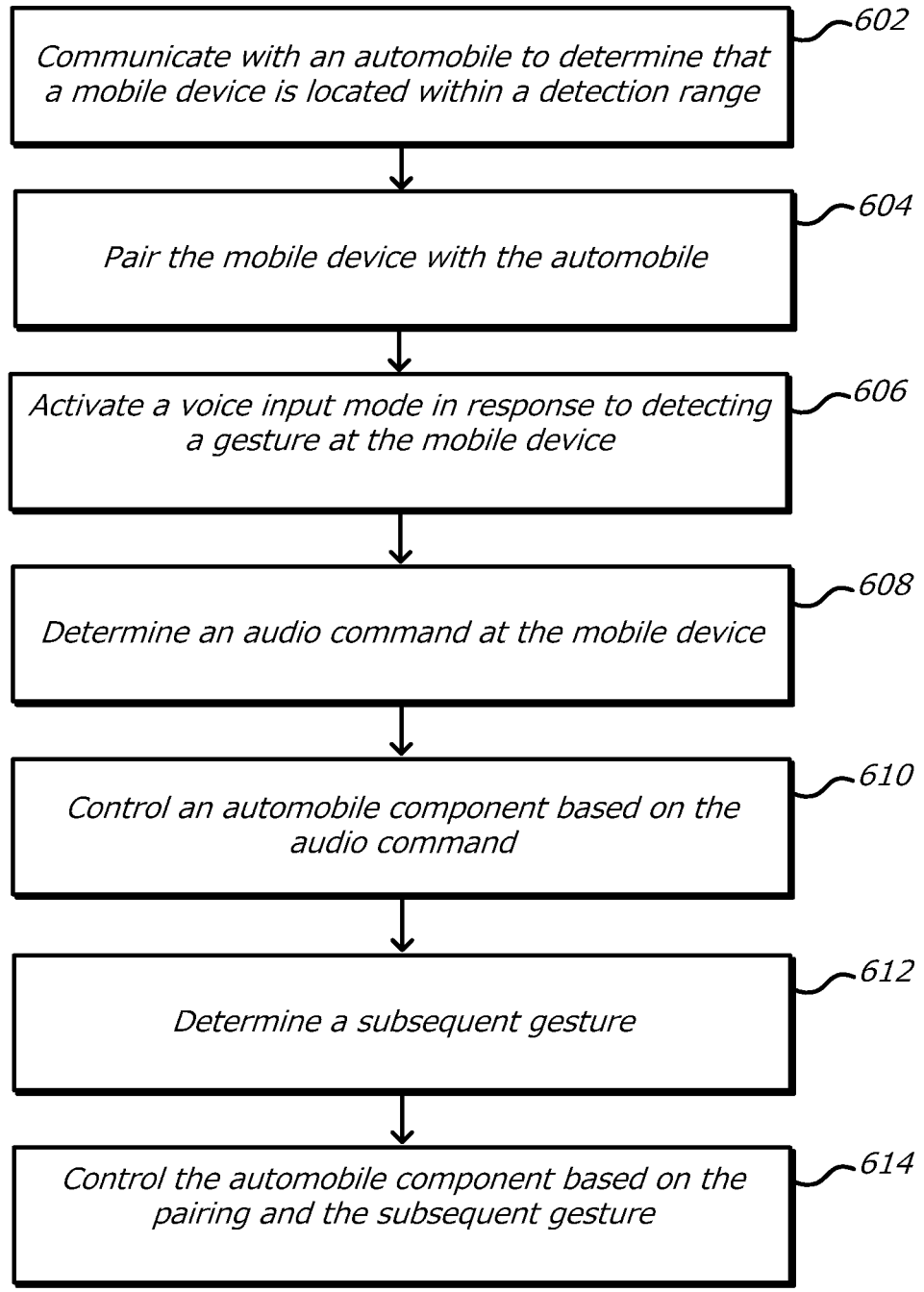
FIG. 6 illustrates an example process for determining user input to a mobile device, in accordance with various alternate embodiments.

FIG. 6 illustrates an example process for determining user input to a device, in accordance with various alternate embodiments. At step 602, a mobile device communicates with an automobile to determine that the device is positioned or located within a detection range of the automobile, wherein the determination causes the device to activate a media control mode or other mode that can be used to control a component of the automobile. In this mode, the device can detect a user's hand, or other object, within a gesture area (e.g., a foot away from the device) to cause the device to perform a function, such as skipping a track playing on a media player of the device.

At step 604, in response to determining that the device is positioned within the automobile, the device is paired with the automobile. The pairing allows the device and the automobile to communicate. For example, gestures detected by the device can be interpreted and used to control at least one of a media player or a navigation system of the automobile. In other embodiments, the pairing enables the device to control any component (or a subset thereof) of the automobile.

At step 606, the mobile device determines a shaking motion (or some other motion) of a hand of the user relative to the computing device that causes the computing device to activate a voice input mode. At step 608, at least one sensor of the mobile device (such as a microphone) is used to determine an audio command being spoken by the user, where the audio command can cause the mobile device to control a component of the automobile (step 610). For example, because the automobile and the mobile device are paired, the audio command can cause the mobile device to activate (and then control) the car audio system of the automobile. In accordance with an embodiment, various other audio commands are possible, in which the commands can be used to activate a program on the device, cause the device to speak back information (such as information relating to a current track playing), or control (while paired with the automobile), a component of the automobile, among others.

At step 612, a subsequent gesture is performed by the user. As described above, the user's hand can be detected based at least in part on data obtained by a front-facing camera, where the one or more images can be analyzed to locate the hand of the user with respect to the device. As part of the location computation, the device determines a motion being performed by the hand of the user within the gesture area, where the motion corresponds to a gesture. At step 614, based at least in part on the motion (and thus corresponding gesture), and assuming the mobile device is controlling the audio system of the automobile, the device can cause a function to be performed with respect to media being presented via the audio system of the automobile (such as causing the media to be paused).

Figure 7:
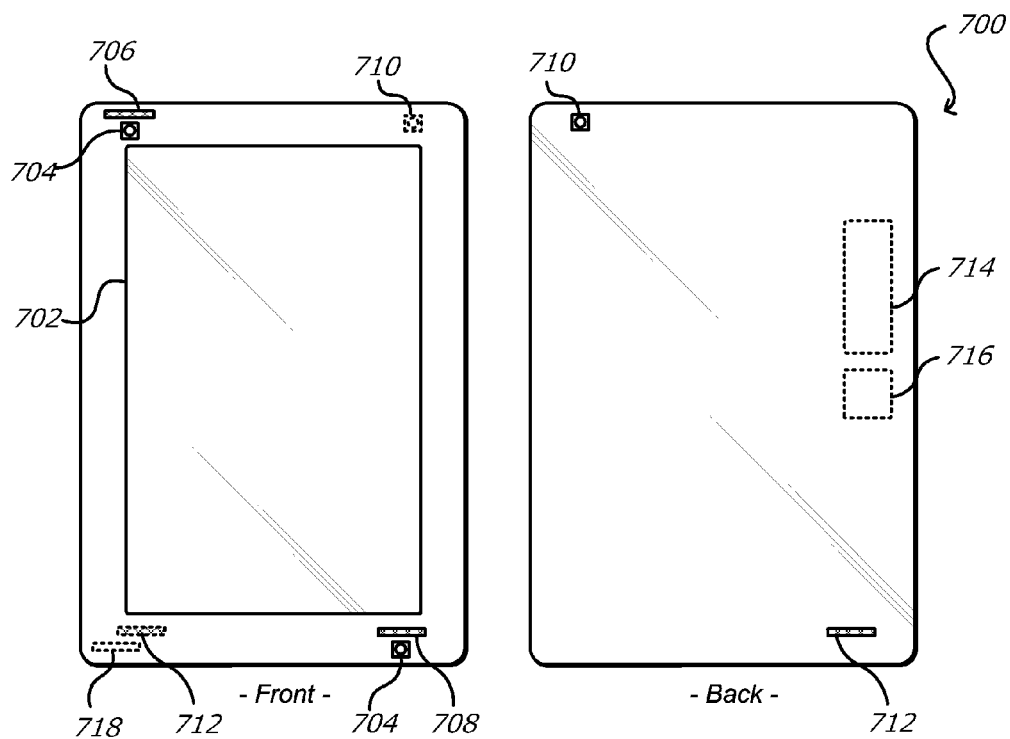
FIG. 7 illustrates front and back views of an example portable computing device that can be used in accordance with various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
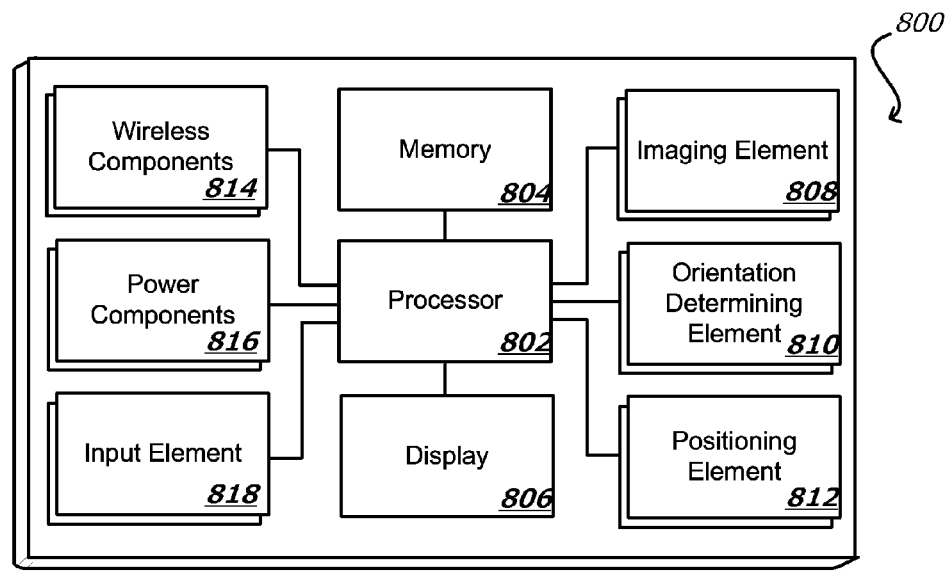
FIG. 8 illustrates an example set of basic components of a portable computing device, such as the device described with respect to FIG. 7.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
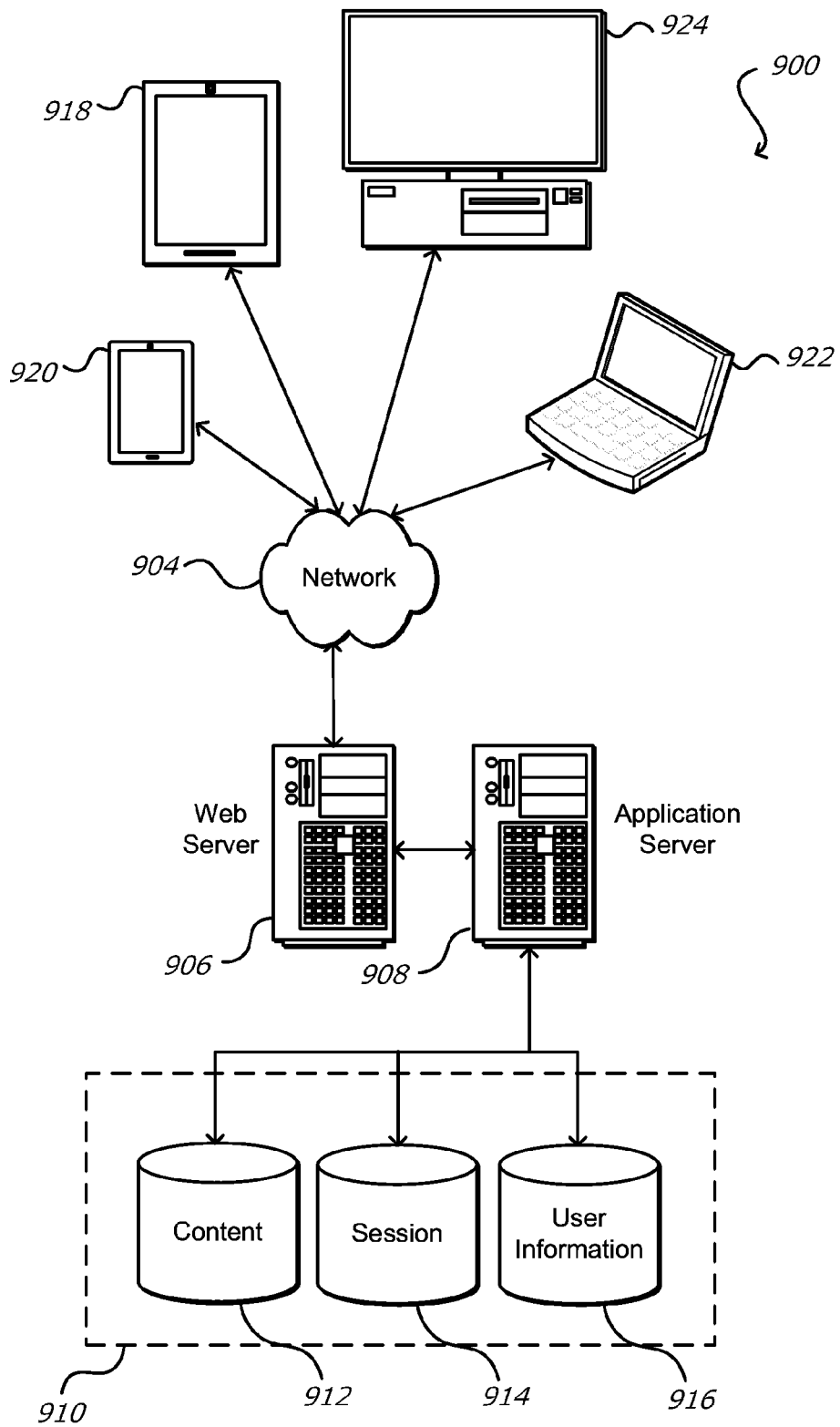
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes electronic client devices 918, 920, 922, and 924, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device.

Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client devices 918, 920, 922, and 924 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 918, 920, 922 and 924. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for determining user input to a mobile computing device, the method comprising:
    under control of one or more computer systems configured with executable instructions,
        communicating with an automobile to determine that a mobile computing device is located within a detection range relative to the automobile;
        determining a movement of the automobile;
        causing the mobile computing device to activate an air gesture input mode in association with the mobile computing device;
        disabling a touch input mode of the mobile computing device based at least in part on the movement of the automobile;
        determining a movement of a user using an infrared detector of the mobile computing device, the infrared detector having a resolution;
        activating a first front-facing camera of the mobile computing device, the first front-facing camera having a first resolution higher than the resolution of the infrared detector;
        activating a second front facing camera of the mobile computing device, the second front-facing camera having a second resolution higher than the resolution of the infrared detector;
        obtaining a first image using the first front-facing camera of the mobile computing device, the first front-facing camera having a first field of view;
        obtaining a second image using the second front-facing camera of the mobile computing device, the second front-facing camera separated a distance from the first front-facing camera and having a second field of view that partially overlaps the first field of view;
        analyzing the first image to determine a feature point corresponding to a representation of a hand of the user with respect to the mobile computing device, the hand being located within an area relative to the mobile computing device;
        analyzing the second image to determine a same feature point;
        determining a first location of the feature point in the first image and a second location of the same feature point in the second image;
        determining a path of the feature point, the path corresponding to a gesture, the gesture being one of a plurality of gestures associated with controlling presentation of media content; and
        causing a function to be performed with respect to the media content being presented, the function corresponding to the gesture.

2. The computer implemented method of claim 1, wherein determining the path of the feature point includes:
    determining a wave of the hand of the user in a left-to-right direction or right-to-left direction relative to the mobile computing device, the wave of the hand being the gesture, wherein the function causes the media content to be skipped or repeated.

3. The computer implemented method of claim 1, further comprising:
    determining that the mobile computing device is positioned within the automobile; and
    pairing the mobile computing device with a media player of the automobile, wherein the function to be performed with respect to the media content is presented via the media player of the automobile.

4. The computer implemented method of claim 1, further comprising:
    determining, based at least in part on the first location and the second location of the feature point, a relative location of the feature point with respect to the mobile computing device, the relative location being in three dimensions.

5. The computer implemented method of claim 4, wherein the gesture comprises one or more movements of the feature point in three dimensions.

6. A computer implemented method, comprising:
under control of one or more computer systems configured with executable instructions,
detecting a connection with an electronic media system of an automobile by a computing device;
determining a movement of the automobile;
causing the computing device to activate an air gesture input mode based at least in part on detecting the connection;
disabling a touch input mode of the computing device based at least in part on the movement of the automobile;
determining a movement of a user using an infrared detector of the computing device, the infrared detector having a resolution;
activating a first front-facing camera of the computing device, the first front-facing camera having a first resolution higher than the resolution of the infrared detector;
activating a second front-facing camera of the computing device, the second front-facing camera having a second resolution higher than the resolution of the infrared detector;
obtaining a first image using the first front-facing camera of the computing device, the first front-facing camera having a first field of view;
obtaining a second image using the second front-facing camera of the computing device, the second front-facing camera separated a distance from the first front-facing camera and having a second field of view that partially overlaps the first field of view;
analyzing the first image to determine a feature point corresponding to a representation of a hand of the user with respect to the computing device, the hand being located within an area relative to the computing device;
analyzing the second image to determine a same feature point;
determining a first location of the feature point in the first image and a second location of the same feature point in the second image;
determining a path of the feature point, the path corresponding to a motion being performed by the user;
determining a gesture corresponding to the motion, the gesture being one of a plurality of gestures corresponding to one or more actions to be performed by the computing device; and
performing the one or more actions corresponding to the gesture.

7. The computer implemented method of claim 6, wherein determining the gesture includes:
determining a forward motion of a hand of the user relative to the computing device, the forward motion of the hand being the gesture,
the gesture causing the computing device to pause a media track being presented.

8. The computer implemented method of claim 7, further comprising:
determining a subsequent forward motion of the hand of the user relative to the computing device; and
causing the media track being presented to resume play.

9. The computer implemented method of claim 6, wherein determining the gesture includes:

determining a shaking motion of the hand of the user relative to the computing device, the shaking motion of the hand being the gesture;
the gesture causing the computing device to activate a voice input mode;
detecting, using at least one sensor of the computing device, an audio command being spoken by the user; and
causing the computing device to perform a second function with respect to an application on the computing device based at least in part on the audio command.

10. The computer implemented method of claim 9, wherein the at least one sensor includes a camera, a capacitive sensor, an ultrasonic sensor, or combinations thereof.

11. The computer implemented method of claim 6, further comprising:
receiving an incoming call;
determining a left-to-right motion of the hand of the user relative to the computing device; and
causing the computing device to answer the incoming call.

12. The computer implemented method of claim 6, further comprising:
pairing the computing device with the automobile, wherein based on the pairing, the computing device is capable of controlling at least one of a media player or a navigation system of the automobile.

13. The computer implemented method of claim 6, wherein determining the gesture includes:
determining a counter-clockwise motion of a hand of the user relative to the computing device, the counter-clockwise motion of the hand being the gesture,
the gesture causing the computing device to rewind a media track being presented.

14. The computer implemented method of claim 6,
wherein determining the gesture includes:
determining a clockwise motion of a hand of the user relative to the computing device, the clockwise motion of the hand being the gesture,
the gesture causing the computing device to fast-forward a media track being presented.

15. The computer implemented method of claim 6, wherein determining the gesture includes:
determining, based at least in part on analyzing image information obtained from one or more images captured by the computing device, a position of the hand of the user with respect to the computing device; and
based at least in part on analyzing the image information and the position of the hand of the user, determining the gesture being performed by the hand of the user.

16. A computing system, comprising:
at least one processor; and
memory including instructions that, when executed by the processor, cause the computing system to:
detect a connection with an electronic media system of an automobile by a computing device;
determining a movement of the automobile;
cause the computing device to activate an air gesture input mode based at least in part on detecting the connection;
disabling a touch input mode of the computing device based at least in part on the movement of the automobile;
determining a movement of a user using an infrared detector of the computing device, the infrared detector having a resolution;

activating a first front-facing camera of the computing device, the first front-facing camera having a first resolution higher than the resolution of the infrared detector;

activating a second front-facing camera of the computing device, the second front-facing camera having a second resolution higher than the resolution of the infrared detector;

obtain a first image using the first front-facing camera of the computing device, the first front-facing camera having a first field of view;

obtain a second image using the second front-facing camera of the computing device, the second front-facing camera separated a distance from the first front-facing camera and having a second field of view that partially overlaps the first field of view;

analyze the first image to determine a feature point corresponding to a representation of a hand of the user with respect to the mobile computing device, the hand being located within an area relative to the mobile computing device;

analyze the second image to determine a same feature point;

determine a first location of the feature point in the first image and a second location of the same feature point in the second image;

determine a path of the feature point, the path corresponding to a gesture, the gesture being one of a plurality of gestures corresponding to one or more actions to be performed by the computing device; and perform the one or more actions corresponding to the gesture.

17. The computing system of claim 16, wherein the instructions, when executed, further cause the computing device to:
determine a down-to-up motion of the hand of the user relative to the computing device, the down-to-up motion of the hand being the gesture,
the gesture causing the computing device to increase a volume of a media track being presented.

18. The computing system of claim 16, wherein the instructions, when executed, further cause the computing device to:
receive an incoming call;
determine the hand of the user being held over the computing device; and
cause the computing device, the computing device to reject the incoming call.

19. The computing system of claim 16, wherein the instructions, when executed, further cause the computing device to:
communicate with the automobile to establish the connection;
activate the air gesture input mode based at least in part on the connection being established; and
pair the computing device with at least one of a media player or a navigation system of the automobile, the computing device being able to control one of the media player or the navigation system of the automobile based at least in part on the pairing.

20. The computing system of claim 16, wherein the instructions, when executed, further cause the computing device to:
determine a right-to-left motion of the hand of the user relative to the computing device, the right-to-left motion of the hand being the gesture,
the gesture causing the computing device to repeat a media track being presented.

21. The computing system of claim 20, wherein the instructions, when executed, further cause the computing device to:
determine a subsequent right-to-left motion of the hand of the user relative to the computing device within a determined period of time of repeating the media track; and
cause the computing device to skip to a previous media track being presented.

22. A non-transitory computer readable storage medium storing one or more sequences of instructions executable by one or more processors to perform a set of operations comprising:
detecting a connection with an electronic media system of an automobile by a computing device;
determining a movement of the automobile;
causing the computing device to activate an air gesture input mode based at least in part on detecting the connection;
disabling a touch input mode of the computing device based at least in part on the movement of the automobile;
determining a movement of a user using an infrared detector of the computing device, the infrared detector having a resolution;
activating a first front-facing camera of the computing device, the first front-facing camera having a first resolution higher than the resolution of the infrared detector;
activating a second front-facing camera of the computing device, the second front-facing camera having a second resolution higher than the resolution of the infrared detector;
obtaining a first image using the first front-facing camera of the computing device, the first front-facing camera having a first field of view;
obtaining a second image using the second front-facing camera of the computing device, the second front-facing camera separated a distance from the first front-facing camera and having a second field of view that partially overlaps the first field of view;
analyzing the first image to determine a feature point corresponding to a representation of a hand of the user with respect to the computing device, the hand being located within a gesture area relative to the computing device;
analyzing the second image to determine a same feature point;
determining a first location of the feature point in the first image and a second location of the same feature point in the second image;
determining a path of the feature point, the path corresponding to a gesture, the gesture being one of a plurality of gestures corresponding to one or more actions to be performed by the computing device; and
performing the one or more actions corresponding to the gesture.

23. The non-transitory computer readable storage medium of claim 22, further comprising instructions executed by the one or more processors to perform the operations of:
determining a shaking motion of the hand of the user relative to the computing device, the shaking motion of the hand being the gesture, the gesture causing the computing device to activate a voice input mode;
detecting, using at least one sensor of the computing device, an audio command being spoken by the user; and
causing the computing device to perform a second function with respect to an application on the computing device based at least in part on the audio command.

24. The non-transitory computer readable storage medium of claim 22,
determine an up-to-down motion of the hand of the user relative to the computing device, the up-to-down motion of the hand being the gesture, the gesture causing the computing device to decrease a volume of a media track being presented via the computing device.

25. A computer implemented method for determining user input to a mobile computing device, the method comprising:

under control of one or more computer systems configured with executable instructions, communicating with an automobile to determine that a mobile computing device is located within a detection range relative to the automobile;

causing the mobile computing device to activate an air gesture input mode in association with the mobile computing device;

disabling a touch input mode of the mobile computing device;

determining a movement of a user using an infrared detector of the mobile computing device, the infrared detector having a resolution;

activating a first front-facing camera of the mobile computing device the first front-facing camera having a first resolution higher than the resolution of the infrared detector;

activating a second front facing camera of the mobile computing device, the second front-facing camera having a second resolution higher than the resolution of the infrared detector;

obtaining a first image using the first front-facing camera of the mobile computing device, the first front-facing camera having a first field of view;

obtaining a second image using the second front-facing camera of the mobile computing device, the second front-facing camera separated a distance from the first front-facing camera and having a second field of view that partially overlaps the first field of view;

analyzing the first image to determine a feature point corresponding to a representation of a hand of the user with respect to the mobile computing device, the hand being located within an area relative to the mobile computing device;

analyzing the second image to determine a same feature point;

determining a first location of the feature point in the first image and a second location of the same feature point in the second image;

determining a path of the feature point, the path corresponding to a gesture, the gesture being one of a plurality of gestures associated with controlling presentation of media content; and causing a function to be performed with respect to the media content being presented, the function corresponding to the gesture.

\* \* \* \* \*